W. N. Whiteley, Jr.,
Pitman Head.

Nº 56,304.        Patented July 10, 1866.

Witnesses:
Andrew Whiteley
N. S. Browne

Inventor:
Wm N. Whiteley Jr.
By his Atty R. D. O. Smith

UNITED STATES PATENT OFFICE.

WM. N. WHITELY, JR., OF SPRINGFIELD, OHIO.

IMPROVED PITMAN-HEAD AND CRANK-WRIST BOX FOR HARVESTING-MACHINES.

Specification forming part of Letters Patent No. 56,304, dated July 10, 1866.

*To all whom it may concern:*

Be it known that I, WILLIAM N. WHITELY, Jr., of Springfield, in the county of Clarke and State of Ohio, have invented a new and Improved Mode of Constructing Pitman-Heads and Crank-Wrist Boxes for Harvesting-Machines and Similar Purposes; and I do hereby declare the following to be a full, clear, and exact description of the same, reference being had to the accompanying drawings, in which—

Figure 1:
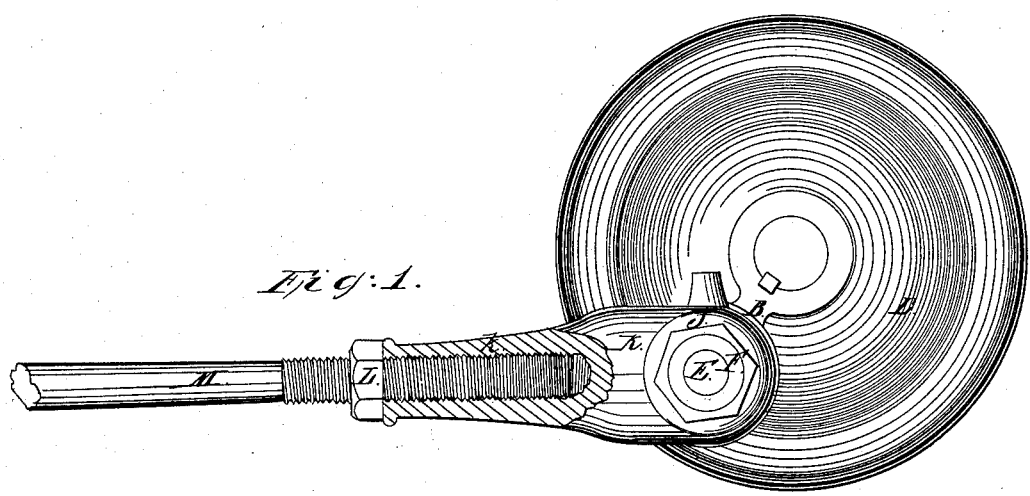
Figure 2:
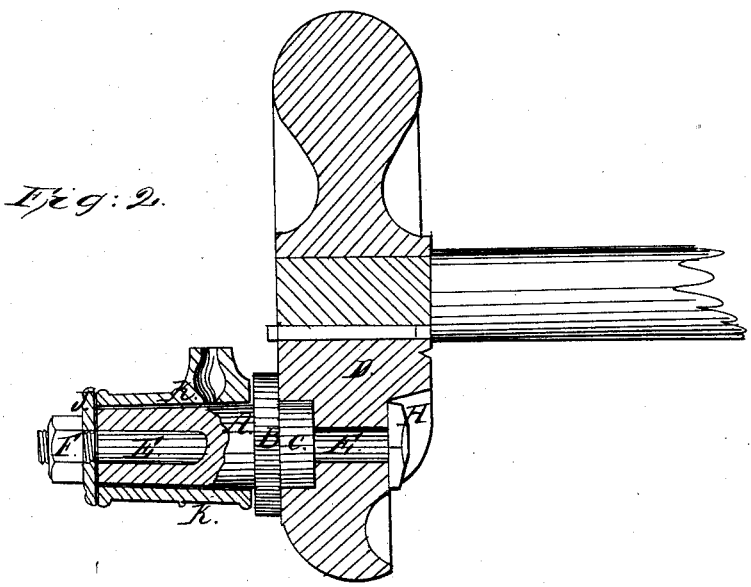

Figure 1 is an elevation of the fly-wheel of a "Champion" harvesting-machine, a portion of the pitman-head being broken away so as to show the means of lengthening and shortening the pitman. Fig. 2 is a sectional view of the pitman-head, the wrist-pin, and the fly-wheel, showing the construction and mode of attachment.

That others may understand the nature of my invention, I will more particularly describe it.

The pitman-crank of a harvesting-machine is required to withstand more severe usage, probably, than a similar device in any other machine. The motion of the cutters is very rapid, the throw of the crank is short, and the reciprocations are violent. The bearing is also more or less accessible to dirt, and all of these conditions, which are unavoidable, tend to the early destruction of these parts.

The severe jerks at each reversal of the movement of the cutter and the presence of more or less grit in the joint soon cause the ordinary journal-box to wear out or break, and a slight wearing of the surfaces of either the wrist or its box causes a looseness between them, which increases with great rapidity, and soon causes the machine to cease operating or be liable to great damage.

The common theory that metals of dissimilar density will wear upon each other with less friction than if the metals are alike has been found to be only partially true in practice. If both surfaces be comparatively soft, as ordinary iron and brass, the rule holds good; but if both surfaces can be made excessively hard it does not hold good. And it is furthermore true that hard bearings require less lubrication than soft ones. An instance of this may be found in watch and chronometer movements, where a steel pivot is found to run better and longer upon a bearing made from a gem than upon the brass of the frame.

Hardened steel bearings have also been found to be much superior in these respects to softer metals.

It is in view of these facts that I have constructed my pitman-cranks by casting both the wrist-pin and the pitman-head upon chills, and thus at a very cheap rate procuring bearing-surfaces of excessive hardness. In the drawings the chilled surfaces are colored red and blue.

For convenience of construction and attachment I construct the wrist-pin A with a hole through it in the direction of its axis by casting it around a sand core and with a collar or annular flange, B, near its base.

The head C fits into a socket cast in the fly-wheel D, and the bolt E, passing through both wheel D and wrist-pin A, securely clamps and holds the two together when the nut F is in place.

The head G of the bolt E is confined between two flanges, H, which project from the surface of the fly-wheel so as to form a recess having walls at right angles to each other, so that the bolt E cannot turn upon its axis while the nut F is being screwed down.

When the pitman-head is placed on the wrist-pin the washer J and nut F are placed on the bolt E and screwed down, and the parts are then securely held in place.

That the pitman M may be adjustable as to its length, I attach it to the head K by means of a screw, the male part of which is cut upon the surface of the pitman-rod and the female part within a socket in the neck $k$ of the pitman-head. A set-nut, L, completes the arrangement.

Having described my invention, what I claim as new, and desire to secure by Letters Patent, is—

1. The chilled-box pitman-head K, constructed with the internal screw, $k$, in combination with the jam-nut L and pitman-rod M, substantially as described.

2. The pitman-head K, when cast in one piece over a taper chill-pin and provided with the internal screw, $k$, in combination with the jam-nut L, pitman-rod M, and chilled hollow spindle A, substantially as described.

WM. N. WHITELY, JR.

Witnesses:
  O. S. KELLY,
  GEO. W. BENNS.